(No Model.) 2 Sheets—Sheet 1.

J. W. BETTENDORF.
METAL WHEEL AND METHOD OF MAKING SAME.

No. 496,633. Patented May 2, 1893.

Witnesses
Raymond F. Barnes
F. Stanly Elmore

Inventor
J. W. Bettendorf
P. T. Dodge, Atty.

(No Model.) 2 Sheets—Sheet 2.
J. W. BETTENDORF.
METAL WHEEL AND METHOD OF MAKING SAME.
No. 496,633. Patented May 2, 1893.
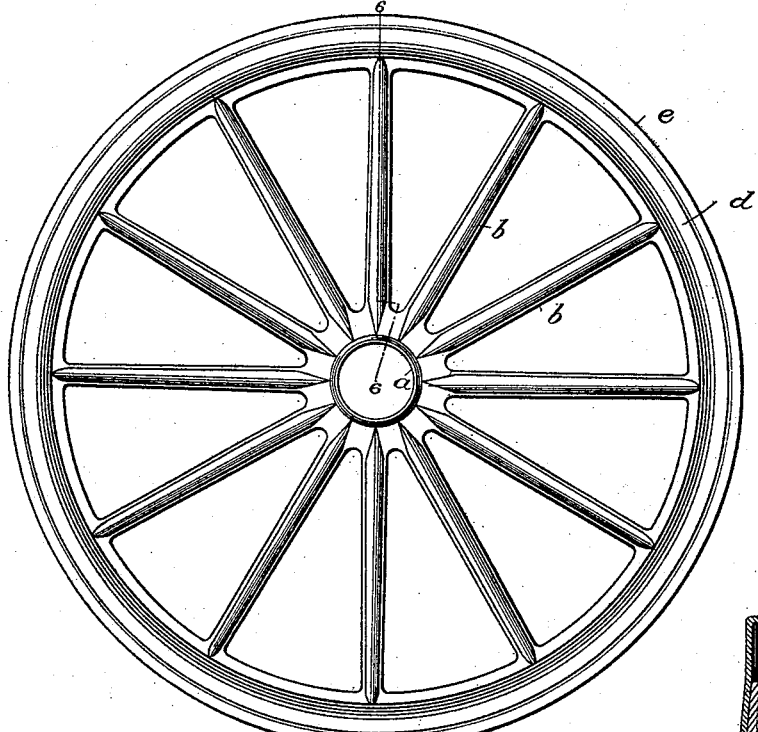
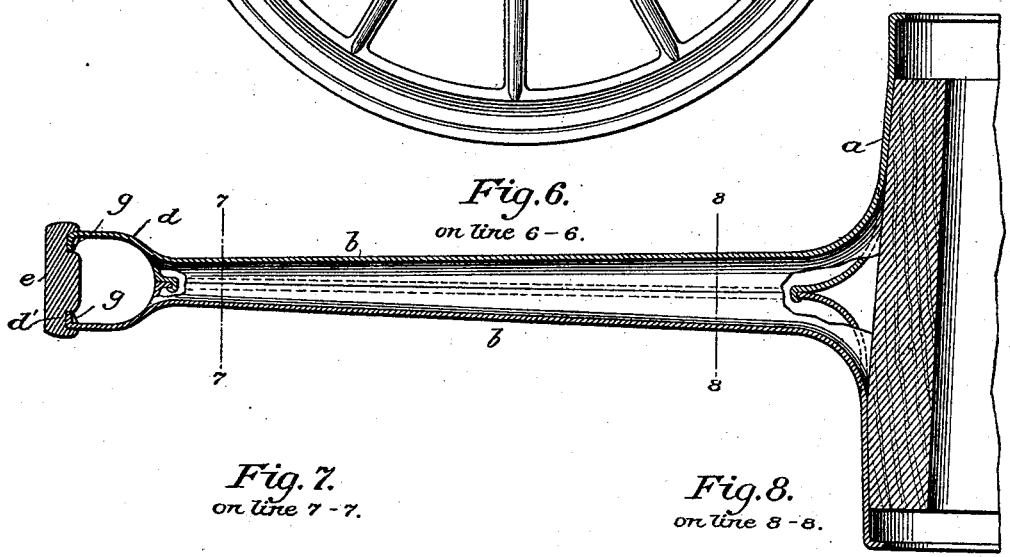
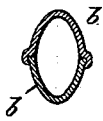
Witnesses
Raymond F. Barnes.
F. Stanley Elmore.
Inventor
J. W. Bettendorf
By P. F. Dodge
Attorney
THE NORRIS PETERS CO., PHOTO-LITHO., WASHINGTON, D. C.

UNITED STATES PATENT OFFICE.

JOSEPH WM. BETTENDORF, OF SPRINGFIELD, OHIO.

METAL WHEEL AND METHOD OF MAKING SAME.

SPECIFICATION forming part of Letters Patent No. 496,633, dated May 2, 1893.

Application filed September 23, 1892. Serial No. 446,730. (No model.)

*To all whom it may concern:*

Be it known that I, JOSEPH WM. BETTENDORF, of Springfield, county of Clark, and State of Ohio, have invented a new and useful Improvement in Metallic Wheels and Method of Making the Same, of which the following is a specification.

My invention relates to metallic wheels, and it consists of an improved wheel designed to combine durability, lightness and strength, and comprising two metallic blanks or members placed face to face and secured together at the hub, spokes and felly, provided with a tire.

The invention also consists in the method of forming the members and of assembling the same to constitute the wheel.

It also consists in the details of construction and combinations of parts hereinafter described and claimed.

In carrying out my method I first provide two circular blanks, forming each at the center with an annular flange struck up therefrom, and cutting away portions of the blank to leave the spokes and felly. I next give to the spokes and felly the form which they are to have in the finished wheel, then place the blanks face to face, and secure them together at the hub, spokes and inner edge of the felly. The tire is then applied and the hub provided with the usual bushing or box.

Figure 1:
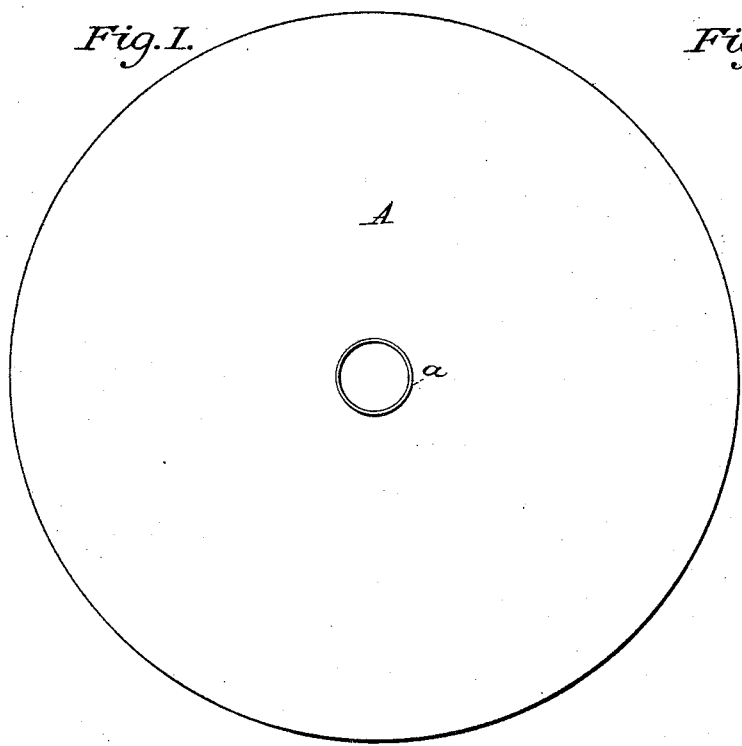
Figure 2:
Figure 3:
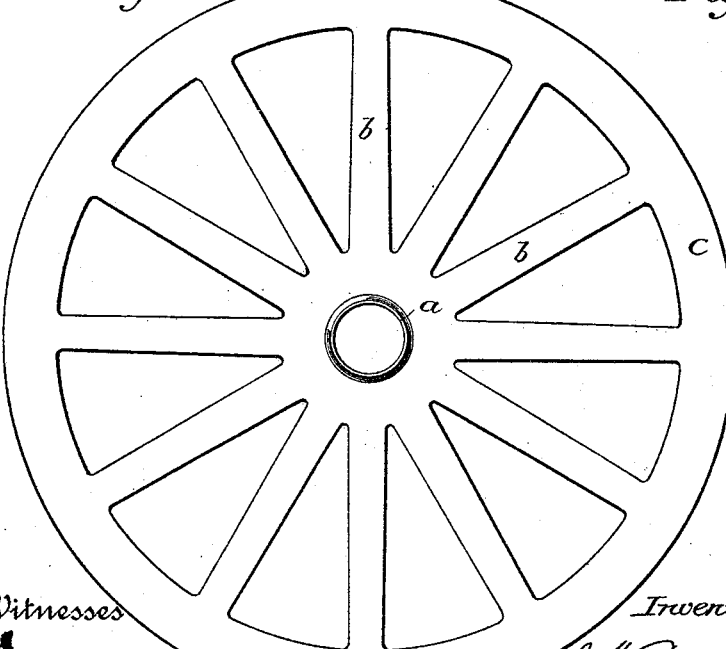
Figure 4:
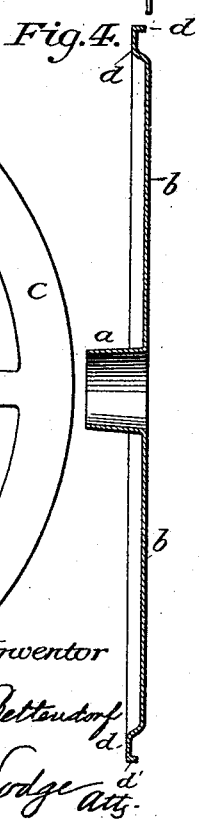

In the accompanying drawings,—Figure 1 is an elevation of one of the blanks from which the wheel is formed. Fig. 2 is an edge view of the same showing the hub struck up therefrom. Fig. 3 is an elevation showing the blank cut away at the proper points to leave the spokes and felly. Fig. 4 is a view showing the edge of the blank bent outward to form the felly. Fig. 5 is a side elevation of the completed wheel. Fig. 6 is a section through the same on line 6—6 of Fig. 5. Fig. 7 is a horizontal section through one of the spokes on the line 7—7 of Fig. 6. Fig. 8 is a similar section on the line 8—8 of Fig. 6.

Referring to the drawings,— In carrying out my invention I first provide two circular sheet metal blanks A, as represented in Fig. 1, and form each at the center, by means of a punching or drawing operation, or by any other suitable means, with an annular projecting flange $a$, designed to constitute the hub. I next cut away portions of this blank leaving radial strips $b\ b$, &c., and a surrounding connecting rim C, designed to constitute respectively, the spokes and the felly of the wheel. I then, by any appropriate means, groove or dish the radial strips $b\ b$, and bend the surrounding rim $d$ outward and form thereon an inwardly-projecting flange $d'$, as represented in Fig. 4, so that in elevation the blank will represent the appearance indicated in Fig. 5. I next place two of such blanks face to face with the projecting surfaces outward and by any suitable means secure the same together at the edges along the spokes and between the same at the hub and felly, as plainly represented in Fig. 6. The blanks may be connected by any suitable means, such as the electric welding operation, but I have represented in the drawings the edge of one blank bent laterally across that of the other and then against the side of the same adjacent to its edge. I finally apply the tire $e$, and provide the hub with the usual bushing, which may be of any appropriate material. In order to prevent the flange and felly from binding, and to give the same the requisite strength to withstand the shrinking of the tire, I form therein transverse corrugations $g$.

It will be observed that the body of my wheel is composed of but two members, and that the hub, spokes and felly are integral parts thereof. Owing to this construction and to the fact that these two members are connected along the edges of the spokes and between them at the hub and felly, the wheel will possess lightness, durability and strength.

Having thus described my invention, what I claim is—

1. The improved method of making metallic wheels, consisting in providing two metallic blanks, forming the same at the center with an annular flange, removing portions of the blank to leave radial strips, and a surrounding rim, grooving said strips and rim, placing the blanks face to face, and securing the same together.

2. The improved method of making wheels which consists in providing two sheet metal circular blanks, forming the same at the center with an annular flange, cutting away portions of the blank to leave radial strips and a surrounding rim, dishing the strips and bending the rim outward, applying the same face to face, securing them together along the edges and finally applying the tire.

3. The improved wheel consisting of two metallic members or sections cut out to form integral hub, spokes, and fellies, in skeleton form, said skeleton sections placed together, face to face and united continuously along their meeting edges.

4. A metallic wheel comprising two complementary sections cut out and stamped or bent to form integral hub, spokes, and felly, placed together face to face and united along their meeting edges.

5. The improved wheel, consisting of the two metallic members each provided with the central annular flange, radial grooved spokes and a grooved felly, and secured together along the edges of the same.

6. In a metallic wheel, the combination with the felly provided with inwardly-projecting flanges and the transverse corrugations therein, of the grooved tire seated upon said flanges.

7. In a metallic wheel, the combination with the two metallic members each provided with radial grooved strips and the surrounding outwardly bent rim secured together along the edges of the strips and between the same at the hub and felly, of the tire.

In testimony whereof I hereunto set my hand, this 6th day of July, 1892, in the presence of two attesting witnesses.

JOSEPH WM. BETTENDORF.

Witnesses:
A. B. FREINER,
G. M. WERNTZ.